United States Patent [19]

Hermann

[11] Patent Number: 4,810,892
[45] Date of Patent: Mar. 7, 1989

[54] UNIT AND METHOD UTILIZING A DATA MEDIUM FOR DETERMINING THE RELATIVE POSITION BETWEEN TWO PARTS

[75] Inventor: Ferdinand Hermann, Tegna, Switzerland

[73] Assignee: AG fur industrielle Elektronik AGIE, Losone b Locarno, Switzerland

[21] Appl. No.: 881,044
[22] PCT Filed: Oct. 8, 1985
[86] PCT No.: PCT/CH85/00148
   § 371 Date: Jun. 6, 1986
   § 102(e) Date: Jun. 6, 1986
[87] PCT Pub. No.: WO86/02156
   PCT Pub. Date: Apr. 10, 1986

[30] Foreign Application Priority Data

Oct. 8, 1984 [DE] Fed. Rep. of Germany ....... 3436843

[51] Int. Cl.⁴ .............................................. G06K 7/10
[52] U.S. Cl. .............................. 250/566; 250/231 SE
[58] Field of Search ............ 250/231 SE, 237 G, 566, 250/570; 235/454, 376; 369/43, 44; 360/75, 77, 103, DIG. 1; 340/347 P; 356/373, 375; 33/125 A, 125 C; 341/13

[56] References Cited

U.S. PATENT DOCUMENTS

| | | | |
|---|---|---|---|
| 3,839,800 | 10/1974 | Bederman | 33/174 L |
| 4,047,025 | 9/1977 | Lemelson | 250/237 G |
| 4,054,746 | 10/1977 | Kamm | 178/19 |
| 4,172,265 | 10/1979 | Sakamoto et al. | 360/DIG. 1 |
| 4,325,134 | 4/1982 | Langley et al. | 369/58 |
| 4,616,131 | 10/1986 | Burkhardt | 250/231 SE |
| 4,659,924 | 4/1987 | Tokunaga | 250/231 SE |
| 4,667,096 | 5/1987 | Dangschat | 250/237 G |
| 4,733,069 | 3/1988 | Narutaki | 341/13 |

Primary Examiner—David C. Nelms
Assistant Examiner—Michael Messinger
Attorney, Agent, or Firm—Helfgott & Karas

[57] ABSTRACT

An element of a machine is provided with a magnetically or optically readable data medium. The data medium is divided into grooves and sectors. A corresponding scanning head for scanning the data medium is arranged on another element of the machine. The data are coded so that it is possible to identify each sector and each groove on the data medium. After reading the contents of the data medium of the element of the machine by the scanning head of the other element, a value of the measurement of the relative positions of the two elements is affected to the data read by the head. This value may be used to control the position of the elements or to displace one of the elements relative to the other. The data medium may be linear or may be configured as a disc. The scanning head may be secured to the associated element. It may also be attached by means of a mechanism so as to have a relative motion with respect to the data medium even when the elements are stationary with respect to each other.

27 Claims, 1 Drawing Sheet

UNIT AND METHOD UTILIZING A DATA MEDIUM FOR DETERMINING THE RELATIVE POSITION BETWEEN TWO PARTS

BACKGROUND OF THE INVENTION

The invention relates to a unit for determining the relative position between two parts, particularly between a workpiece and a tool, for controlling the position or displacement thereof, as well as a method for operating said unit.

The control of the relative position or displacement between parts whilst attaining and respecting a precision of approximately 1 micrometer, particularly between a workpiece and a tool, e.g. for metal cutting in a machine tool or non-cutting metal working in a spark erosion machine confronts an expert with problems, which are inter alia caused by the necessary precision, reproducibility and reliability of the position measurement per se, as well as the disturbing influence of environmental conditions (contamination, electrical and magnetic fields, etc) and their fluctuations (thermally caused length changes, periodic deformations by vibrations, slow plastic deformations through forces applied, etc). In order to eliminate such fault and error sources and for improving the geometrical precision attainable with machines, e.g. when producing workpieces, numerous principles have already been applied and numerous methods and units proposed.

Thus, e.g. using the principle of the magnetic storage of data, it is known (DE-20907175) to measure the relative displacement between two parts, namely between a workpiece and a tool, by means of a magnetic track fixed to one part with periodic calibration signals recorded thereon and two magnetic heads fixed to the second part for reading the magnetic track. By means of a specially constructed circuit for producing and evaluating the read signals, the relative displacement is given incrementally by pulses, the precision achieved being allegedly approximately 5 micrometers per pulse. This neither satisfies the present precision required e.g. of spark erosion machines, nor the necessary operational reliability, because the periodic signals recorded on the magnetic track can, on the one hand, have perodicity errors and, on the other hand, can be disturbed or erased by environmentally caused, random, electromagnetic influences.

Using the principle of the optical storage of data, it is known (DE-3007311, U.S. Pat. No. 3,578,979) to read a scale provided with periodically changing light and dark or optically transparent and opaque marks by means of the combination of a light source and a detector arrangement, the scale being fixed to one part and the light source and detector arrangement to the other part, between which the relative displacement is to be measured. The result is an incremental position determination. Through a special construction of the scale with several scanning tracks and a special construction of the detector arrangement with scanning fields corresponding to the increments of the periodic scales and which are phase displaced with respect to one another, an interpolation of the increments is made possible and consequently the precision which can be achieved is increased. In the case of such an apparatus, the precision achieved is claimed to be roughly 1 micrometer per pulse, particularly if there is an interpolation of the scale division through the formation of Moire fringes (U.S. Pat. No. 3,779,647). The functional reliability of such units is, however, susceptible to contamination. In addition, the manufacture and adjustment thereof are difficult, i.e. costly, so that for reducing these disadvantages it has e.g. been proposed (EP-102472) to have the detector arrangement adjustably directly arranged on the machine where it is used, by means of a mechanical device. However, such a solution is once again unsatisfactory with respect to the influence of vibrations. Problems are also caused by the pecise fixing of the finished scale to the machine and for the elimination thereof it has e.g. been proposed (EP-48478) to produce the code pattern only after applying the scale carrier to the machine, so as in this way to avoid eccentricity errors. However, such a solution is a costly procedure, which cannot be easily integrated into the machine production sequence.

It has also been proposed to achieve the desired precision of the relative position determination using the principle of interferometry (U.S. Pat. No. 3,409,375), but this requires laser light of high coherence and good concentration, which is correspondingly costly. For overcoming certain of the problems encountered in the measurement of great lengths and paths, special solutions have already proposed (U.S. Pat. Nos. 3,884,580; 4,195,412) but they require a corresponding high expenditure. In addition, the precision of the order of magnitude of approximately 25 nanometers obtained in laser interferometry is too high, in the sense that the measuring method is too susceptible to disturbance by vibrations. The interference bands cannot be differentiated from one another and can therefore only be counted incrementally, so that any vibration of the machine and any e.g. thermally caused change to the refractive index of the air on the path of the light beam leads to incorrect counting of the increments. The corresponding solutions for overcoming these problems in metal working machines are complicated and costly (U.S. Pat. Nos. 3,520,613; 3,708,657; 4,365,301).

The general problem is that to achieve the desired precision the cooperating parts of the measuring apparatus should be directly arranged and fixed on the parts, whose relative position is to be determined. Thus, it is known in a metal working machine to arrange a code wheel on a shaft and to accurately measure the rotation or rotation position of said shaft (U.S. Pat. No. 3,983,391). However, the precision is lost in the gear, which transfers the movement and position of the shaft to the corresponding part (workpiece or workbench). In addition, the control of the relative movement of the parts is impaired by the gear play inversion, i.e. the dead distance corresponding to the clearance in the gear at shaft reversal, giving an unreliability of position corresponding to the gear play inversion and dead distance. It has therefore been proposed (U.S. Pat. Nos. 3,736,818; 4,221,995) to omit mechanical transmissions or replace them by hydraulic drives or linear motors. These measures can contribute to the desired precision, but do not in themselves lead to this.

SUMMARY OF THE INVENTION

It is an object of the present invention is to provide a new method and device enabling the control of the relative position or displacement between machine parts to be achieved, whilst attaining a precision of approximately 1 micrometer with acceptable expenditure. In particular, between a workpiece and a tool, e.g. for metal cutting in a machine tool or for non-cutting metal working in an electroerosion machine, the reproducibility and reliability of the position measurement should be in the micrometer range and must be largely free of the disturbing influence of environmental conditions and fluctuations thereof.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENTS

Figure 1:
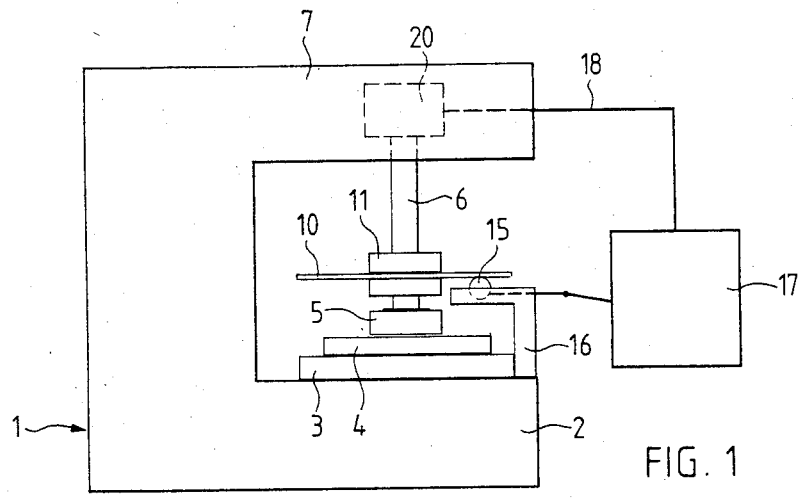
FIG. 1 is a diagrammatic view of the unit according to the present invention.

With reference to FIG. 1, it will be seen that the unit of the present invention comprises a working machine 1, which can e.g. be an electroerosion machine. Such a machine 1 has a U-shaped frame, which has a lower leg 2 and an upper leg 7. On the top of the lower leg 2 is provided a table 3, to which is fixed a workpiece 4, which is worked with the aid of a tool 5. Tool 5 is fixed to one end of a holder 6, which is movably arranged in the upper leg 7 of the frame of machine 1. Holder 6 can be moved in both, the vertical and horizontal direction, in accordance with the program controlling the working of workpiece 4. Above tool 5, a data carrier or medium 10 is placed on the holder. This data medium 10 can be fixed to holder 6 or can be connected by means of a gear 11 thereto. This gear also contains a not shown drive enabling the data medium 10 to be moved, even if the holder 6 and therefore also the tool 5 are stationary.

A scanning head 15 is associated with data medium 10 advantageously from the underside thereof, said scanning head 15 being movable with respect to the data medium 10. Scanning head 15 is located in a slide 16, which is connected to the lower leg 2 of the machine frame. However, in certain circumstances, slide 16 can be fixed to the workpiece 4. Scanning head 15 is connected to an evaluation circuit 17, in which are processed the data read by the scanning head 15. The corresponding signals are supplied via a line 18 to the drive 20 of holder 6, so that said drive 20 can control holder 6 whilst taking account of both the instructions of the program and the signals from the evaluation circuit 17.

Figure 2:
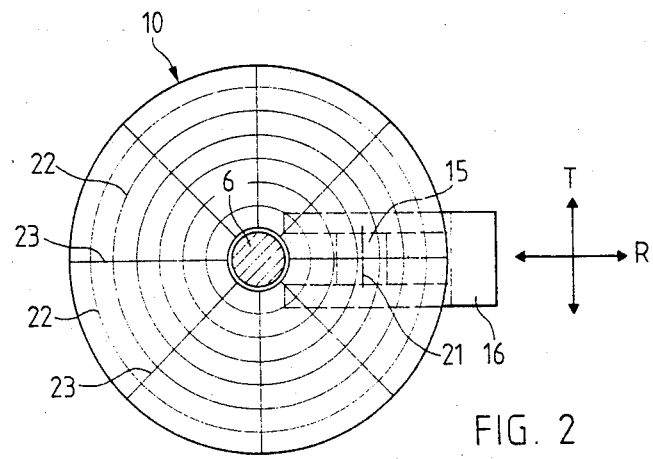
FIG. 2 is a plan view of an embodiment of the unit using a disc-like data medium or carrier.

FIG. 2 shows in plan view a disc-like data medium 10, which is rigidly secured to holder 6. Slide 16 carries the scanning head 15, whose scanning slit 21 is indicated by a dot-dash line. The data medium 10 has concentric tracks 22, into which the data are magnetically, optically or otherwise written. The tracks 22 of data medium 10 are subdivided into sectors 23. Informations are written into the tracks 22 and sectors 23 and permit a clear identification of the particular sector 23 and the particular track 22.

For scanning the data from medium 10, slid 16, in which is displaceably mounted the scanning head 15, can be moved or swung either in the radial direction R, or in the tangential direction T, or in both directions simultaneously.

Figure 3:
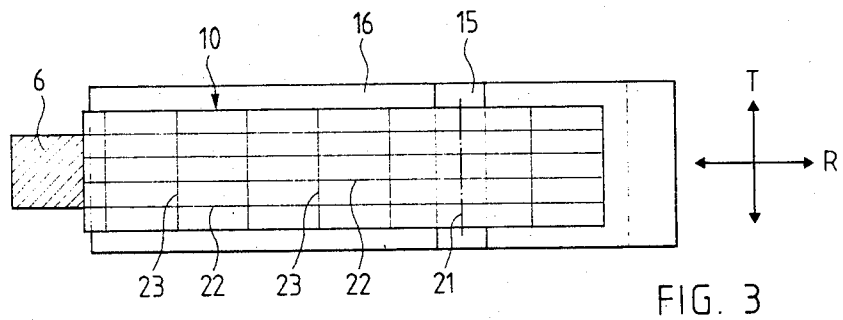
FIG. 3 is a in plan view an embodiment of view the unit using a linear data medium or carrier.

However, data medium 10 can also be linear, as is diagrammatically indicated in FIG. 3. Such a data medium 10 is in the form of a strip, one end thereof being fixed to the holder 6. Beneath the data medium 10 is the scanning head 15 with the scanning slit 21, which is movably mounted in slide 16. Hereagain, slide 16 can be moved in direction R and/or T.

For determining the position of machine parts, an information, which for each sector in each track forms a clear identification of the particular sector and track is stored on a magnetically or optically readable data medium subdivided into recording tracks and sectors. The data medium can be disc-like or linear so that, in accordance with the particular construction, it can be used for positioning machine parts with respect to rotary or longitudinal movements. The nature of the data storage is known per se, e.g. in the form of a sequence of magnetized domains on a magnetizable carrier for magnetically readable data or in the form of a sequence of burnt in holes or non-reflecting points on a mirror-smooth carrier for optically readable data.

The information carrier is then fixed to one machine part, whilst the corresponding reading head which, as a function of the data recording type, is a magnetic or an optical reading head of per se known type, such as e.g. for magnetic discs (e.g. so-called floppy discs and Winchester discs) or for optical discs (e.g. so-called video discs) is fixed to the other machine part. The particular machine parts are those between which the relative position is to be measured or the movement is to be controlled and the reading head is arranged with respect the data medium in such a way that a completely satisfactory reading of the data medium by the reading head is ensured, which also known per se e.g. from the technology of data storage on magnetic or optical discs or plates. A conventional evaluation circuit for converting the signals of the reading head into further processable bineary signals follows the reading head within the unit for determining the relative position between the machine parts. For ensuring a continuous data supply from the reading head to the evaluation circuit to ensure that position signals are constantly supplied to a control means connected thereto for the relative position or movement of the machine parts, a constant relative movement of the reading head with respect to the data medium can be provided by means of a drive, even when the machine parts are mutually stationary. According to a variant the data medium can have a rotationally symmetrical construction, e.g. in the form of a plate kept constantly rotating by the drive or a ring kept constantly rotating by the drive, which ensures the constant relative movement of the reading head relative to the plate. The relative movement of the reading head with respect to the plate corresponding to the reciprocal relative movement of the machine parts in this case takes place substantially radially to the plate, it being possible to provide a slight deviation from the radially directed movement (e.g. a deviation of less than 10 angular degrees) in order to bring about an interpolating fine setting (slow motion in the trigonometric ratio to the deviation angle). In another variant the data medium can be constructed e.g. in the form of a linear band fixed to one machine part and the reading head is then so arranged on the other machine part by means of the drive that it periodically swings about a central position and periodically moves with respect to the data medium, even when the machine parts are mutually stationary.

In the case of said latter variant two realisation possibilities exist. In one case the periodic movement of the reading head takes place in the same direction as the relative movement of the machine parts which is to be detected, i.e. so to speak in the longitudinal direction of the data medium, on which the data are recorded in said longitudinal direction and in linear manner, i.e. unidimensionally (but still subdivided into sectors). During the periodic longitudinal movement of the reading head, it passes over at least one sector with data stored thereon and which identify this sector, said data being constantly processed by the unit and passed onto the control means, ensures a reliable control of the position. This is usable in conjunction with a rapid coarse positioning, because the resolution is reduced in that the data sectors follow one another linearly and each data sector defines one position. However, in the case of a suitable coding of the data stored in the individual data sectors, an interpolation can be performed, and this realization can also be used for fine positioning.

In the other realization, the periodic movement of the reading head takes place in a direction which is substantially at right angles to the direcrtion of the relative movement of the machine parts to be detected, i.e. so to speak at right angles to the longitudinal direction of the data medium, which is in turn bidimensionally provided with data, i.e. with sectors extending in the transverse direction of the data medium, which are parallel and juxtaposed in the longitudinal direction of the data medium. During the periodic transverse movement of the reading head, it passes over a sector with the data stored thereon and which identifies said sector. The data are constantly processed by the unit and passed onto the control means ensuring a reliable position control. Obviously the transverse movement of the reading head can either take place in a strictly linear manner or in arcuate form, depending on whether the reading head if fixed to a slide or to a pivot arm (e.g. to the end thereof) for ensuring the movement thereof.

According to a further development of the general inventive principle of kinematic reversal, the reading head could be fixed to one machine part and the data medium to the other machine part in periodically movable manner. The aforementioned realizations can still be used, if the terms "reading head" and "data medium" are interchanged.

For the operation of the presently described unit for determining the relative position between two machine parts for controlling the position or displacement thereof, the following method steps are performed: storage of data on a magnetically or optically readable data medium subdivided into recording tracks and sectors, the data being coded in such a way that the data stored in each sector in each track permits a clear identification of the particular sector and track; reading the data medium arranged on one machine part by means of the reading head arranged on the other machine part; and associating the read data with a measured value of the reciprocal relative position of the machine parts, said measured value being used for controlling reciprocal position or displacement of the machine parts.

I claim:

1. Unit for determining a relative position between two parts, particularly between a workpiece and a tool, for controlling the position or displacement thereof relative to each other, comprising a single magnetically or optically readable data medium subdivided into recording tracks and sectors and on which an information is stored, wherein for each sector in each track a clear identification of the particular sector and the particular track is provided, said data medium being placed on one machine part, whilst a corresponding single reading head provided for reading one single track at a time is placed on another machine part.

2. Unit according to claim 1, wherein the data medium has a disc-like construction.

3. Unit according to claim 1, wherein the data medium has a linear construction.

4. Unit according to claim 1 wherein the data medium is arranged in a fixed manner on one machine part and the corresponding reading head is arranged in fixed manner on the other machine part.

5. Unit according to claim 1 wherein in the case of a data medium arranged on one of the machine parts, the reading head is so arranged and mounted on the other machine part by means of a drive, that it can be given a continuous relative movement with respect to the data medium, even when the machine parts are mutually stationary.

6. Unit according to claim 5, wherein the data medium is constructed in rotationally symmetrical manner and is arranged in constantly rotating manner on the corresponding machine part.

7. Unit according to claim 6, wherein the reading head is movable in a substantially radial manner with respect to the data medium.

8. Unit according to claim 6, wherein the reading head is movable with respect to the data medium, whilst diverging by less than 10 angular degrees from a radial direction.

9. Unit according to claim 5, wherein the data medium is constructed in the form of a linear strip fixed to one machine part and the reading head is so arranged on the other machine part by means of a drive, that it can be periodically oscillated about a central position and can be given a periodic movement relative to the data medium, even when the machine parts are mutually stationary.

10. Unit according to claim 9, wherein the longitudinal direction of the data medium is substantially parallel to the direction of the relative movement of the machine parts, has unidimensionally recorded data parallel to its longitudinal direction, whilst the reading head is also movable parallel to this direction.

11. Unit according to claim 9, wherein the longitudinal direction of the data medium is substantially parallel to the direction of the relative movement of the machine parts, and the data medium is provided with stored data on sectors extending substantially at right angles to said direction and being parallel to one another and being juxtaposed in the longitudinal direction of the data medium and wherein the reading head is also movable at right angles to this direction.

12. Unit according to claim 11, wherein the sectors and the movement of the reading head are linear.

13. Unit according to claim 12, wherein the reading head is arranged on a slide.

14. Unit according to claim 11, wherein the sectors and movement of the reading head are arcuate.

15. Unit according to claim 14, wherein the reading head is placed on a pivot arm.

16. Unit according to claim 1 wherein when the reading head is arranged on one of the machine parts, the data medium is so arranged and mounted on the other machine part by means of a drive, that it can be given a constant relative movement with respect to the reading head, even when the machine parts are mutually stationary.

17. Unit according to claim 16, wherein the data medium is constructed in rotationally symmetrical manner and is arranged in constantly rotating manner on the corresponding machine part.

18. Unit according to claim 17, wherein the data medium is movable in a substantially radial manner with respect to the reading head.

19. Unit according to claim 17, wherein with respect to the reading head, the data medium diverges by less than 10 angular degrees from a radial direction.

20. Unit according to claim 16, wherein the reading head is arranged in fixed manner on one machine part and that the data medium is constructed in the form of a linear strip and is so arranged on the other machine part by means of a drive, that it can be made to periodically oscillate about a central position and even when the machine parts are mutually stationary can be given a periodic movement with respect to the reading head.

21. Unit according to claim 20, wherein the longitudinal direction of the data medium is substantially parallel to the direction of the relative movement of the machine parts, said data medium being provided with unidimensionally recorded data parallel to its longitudinal direction and being also movable parallel to said direction.

22. Unit according to claim 20, wherein the longitudinal direction of the data medium is substantially parallel to the direction of the relative movement of the machine parts and the data medium is provided with stored data on sectors extending substantially at right angles to said direction and being arranged parallel and juxtaposed to one another in the longitudinal direction of the data medium and being also movable at right angles to its longitudinal direction.

23. Unit according to claim 22, wherein the sectors and the movement of the data medium are linear.

24. Unit according to claim 23, wherein the data medium is arranged on a slide.

25. Unit according to claim 22, wherein the sectors and the movement of the data medium are arcuate.

26. Unit according to claim 25, wherein the data medium is arranged on a pivot arm.

27. Method of determining a relative position between two parts, particularly between a workpiece and a tool, for controlling the position or displacement thereof relative to each other, the method compriing the steps of providing a single magnetically or optically readable data medium subdivided into recording tracks and sectors and arranged on one machine part, storing data on said data medium, the data being coded in such a way that the data stored on each sector in each track permit a clear identification of the particular sector and the particular track, reading the data medium arranged on one machine part by means of a corresponding single reading head provided for reading one single track at a time and arranged on another machine part, and associatng the data read with a measured value of the relative position of the machine parts, said measured value being used for controlling the relative position or displacement of the machine parts.

* * * * *